3,642,940
POLYOXYMETHYLENES CONTAINING A BUTADIENE POLYMER AND A VINYL AROMATIC HYDROCARBON OR A METHYL METHACRYLATE POLYMER

Karlheinz Burg, Langenhain, Taunus, and Harald Cherdron, Wiesbaden, Germany, assignors to Farbwerke Hoechst Aktiengesellschaft vormals Meister Lucius & Bruning, Frankfurt am Main, Germany
No Drawing. Filed June 15, 1970, Ser. No. 46,489
Claims priority, application Germany, June 20, 1969, P 19 31 392.9
Int. Cl. C08g 45/04; C08f 15/00, 19/00
U.S. Cl. 260—837                                    10 Claims

ABSTRACT OF THE DISCLOSURE

Thermoplastic moulding compositions with high impact strength are prepared by mixing a polyacetal with a two-phase mixture which is composed of an elastomeric and a hard polymer, the elastomeric phase being dispersed in the hard phase. The moulding compositons obtained can be worked thermoplastically and are suitable for the manufacture of semi-finished and finished products, for example shaped articles, household articles, and machine parts.

---

The present invention relates to thermoplastic moulding compositions on the basis of polyacetals.

It is known that the impact strength of thermoplastic matetrials can be increased—with a coincidental reduction in hardness—by mixing the thermoplasts with caoutchouc-like polymers, for example mixtures of ethylene and vinyl acetate copolymers with polyolefins, mixtures of the said copolymers with poly(vinyl chloride), and mixtures of ethylene and acrylic ester copolymers with polyethylene (cf. French Pat. No. 1,287,912, Belgian Pat. No. 609,574 and U.S. Pat. No. 2,953,541).

Mixtures of polymeric substances differ in a characteristic manner from mixtures of low-molecular weight compounds. Thus a homogeneous phase is obtained in many cases if two low-molecular weight compounds are combined, whereas mixtures of two polymeric substances yield two-phase systems in most cases (cf. L. Bohn, Kolloid-Zeitschrift 213 (1966), 55). The mechanical properties of two-phase polymer mixtures are generally less advantageous than those of the initial components—in particular if the mixture consists of almost equal parts by volume of the two polymers.

The present invention provides thermoplastic moulding compositions consisting of a mixture of (A) from 99 to 50% by weight
  (a) of a homopolymer of formaldehyde or of trioxane, or
  (b) of a copolymer of from 99.9 to 80% by weight of trioxane and from 0.1 to 20% by weight of a cyclic ether having from 3 to 5 ring members or of a cyclic acetal having from 5 to 11 ring members or of a linear polyacetal, and of from 0 to 5% by weight of an alkyl glycidyl formal, polyglycol diglycidyl ether, alkane diol diglyciydl ether, or bis-(alkane triol)-triformal, and
(B) of from 1 to 50% by weight of a two-phase mixture of
  (a) from 5 to 30% by weight of polybutadiene or a poly(acrylic acid ester) or of a copolymer of from 99 to 70% by weight of an acrylic acid ester and of from 1 to 30% by weight of butadiene, styrene or acrylonitrile, or of a copolymer of from 99 to 70% by weight of butadiene and from 1 to 30% by weight of styrene or acrylonitrile, or of a graft copolymer of from 99 to 60% by weight of one of the above-mentioned homo- or copolymers and of from 1 to 40% by weight of styrene or α-methyl-styrene and/or acrylonitrile or methyl methacrylate, and
  (b) from 95 to 70% by weight of polystyrene, poly-(α-methyl-styrene) or poly(methyl methacrylate) or of a copolymer of from 99 to 70% by weight of styrene or α-methyl-styrene and of from 1 to 30% by weight of acrylonitrile.

The proportion of the polyacetal (polyoxymethylene) used as component (A) in the moulding compositions according to the invention is preferably from 98 to 70% by weight, whereas the proportion of component (B) is preferably between 2 and 30% by weight. Moulding compositions which are composed of from 95 to 80% by weight of polyacetal and of from 5 to 20% by weight of the two-phase mixture B) exhibit particularly good mechanical properties.

Under homopolymers of formaldehyde or trioxane there are to be understood such formaldehyde or trioxane homopolymers which have OH-end groups that are stabilized against degradation, for example by esterification or etherification.

If trioxane copolymers are used as component (A), suitable comonomers for trioxane are cyclic ethers having from 3 to 5, preferably 3 ring members, and cyclic acetals having from 5 to 11, preferably from 5 to 8 ring members, or linear polyacetals, each in an amount of from 0.1 to 20, preferably from 0.5 to 10% by weight. Most suitable are copolymers consisting of from 99 to 95% by weight of trioxane and from 1 to 5% by weight of one of the said co-components.

By cyclic ethers there are to be understood compounds of the Formula I (I) 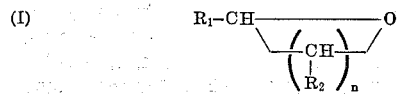

in which $R_1$ and $R_2$ are alike or different and each represents a hydrogen atom, a phenyl radical, an aliphatic alkyl radical having from 1 to 5, preferably from 1 to 3 carbon atoms or an aliphatic alkyl radical with from 1 to 5, preferably from 1 to 3 carbon atoms that has been substituted by from 1 to 3 halogen atoms, preferably chlorine atoms, and wherein $n$ represents a whole number of from 1 to 4.

Use is preferably made of cyclic ethers having 3 ring members, in particular compounds of the Formula II (II) 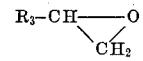

in which $R_3$ represents a hydrogen atom, a phenyl radical, a saturated aliphatic alkyl radical having from 1 to 3 carbon atoms, or a saturated aliphatic alkyl radical with from 1 to 3 carbon atoms that has been substituted by from 1 to 3 halogen atoms, preferably chlorine atoms.

Especially suitable as cyclic ether with 3 ring members is ethylene oxyde; also well suitable are styrene oxyde, propylene oxyde, and epichlorhydrin.

Also cyclohexene-oxyde and phenyl glycidyl ether which may be substituted by alkyl radicals containing from 1 to 4 carbon atoms can be used as cyclic ethers with 3 ring members.

By cyclic acetals there are to be understood compounds of saturated or unsaturated, aliphatic or cyclo-aliphatic diols with aliphatic aldehydes or thioaldehydes, preferably formaldehyde.

Especially suitable are cyclic formals of α,ω-diols having from 2 to 8, preferably from 2 to 4 carbon atoms, the carbon chain of which may be interrupted by an oxygen atom at intervals of 2 carbon atoms. Use is made in particular of cyclic formals of the Formula III (III) 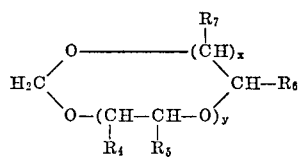

in which $R_4$ to $R_7$ are alike or different and each represents a hydrogen atom, a phenyl radical, an aliphatic alkyl radical having from 1 to 5, preferably from 1 to 3 carbon atoms, or an aliphatic alkyl radical with from 1 to 5, preferably from 1 to 3 carbon atoms that has been substituted by from 1 to 3 halogen atoms, preferably chlorine atoms, and wherein $x$ represents a whole number of from 1 to 7, preferably from 1 to 4, $y$ being zero, or —if $x$ equals 1— $y$ being a whole number of from 1 to 3.

Especially suitable are cyclic formals of saturated aliphatic $\alpha,\omega$-diols having from 2 to 8, preferably from 2 to 4 carbon atoms, as well as cyclic formals of oligoglycols, i.e. cyclic formals of the Formula IV (IV) 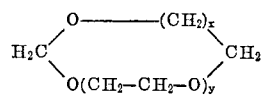

in which $x$ and $y$ represent the above-mentioned numbers.

Suitable as cyclic acetals are, above all, glycol formal (1,3-dioxolane), butanediol formal (1,3-dioxepane) and diglycol formal (1,3,6-trioxocane). Also well suitable are 4-chloromethyl-1,3-dioxolane and hexanediol formal (1,3-dioxonane), as well as butenediol formal (1,3 - dioxacycloheptene-(5)).

Also suitable are copolymers of trioxane with linear polyacetals. By linear polyacetals there are to be understood the homo- or copolymers of the above-mentioned cyclic acetals, as well as linear condensates of aliphatic or cyclo-aliphatic $\alpha,\omega$-diols with aliphatic aldehydes or thioaldehydes, preferably formaldehyde. Use is made in particular of linear formals of saturated aliphatic $\alpha,\omega$-diols having from 2 to 8, preferably from 2 to 4 carbon atoms.

In order to modify the flow of the trioxane copolymers, from 0.05 to 5, preferably from 0.1 to 2% by weight of tercomponents with several polymerizable groups in the molecule, such as alkyl glycidyl formals, polyglycol diglycidyl ethers, alkanediols diglycidyl ethers, or bis(-alkane triols)-triformals can be copolymerized with the trioxane copolymers.

By alkyl glycidyl formals there are to be understood compounds of the Formula V (V) 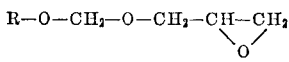

in which R represents an aliphatic alkyl radical having from 1 to 10, preferably from 1 to 5 carbon atoms. Especially suitable are alkyl glycidyl formals of the abovementioned formula with linear saturated and aliphatic alkyl radicals, for example methyl glycidyl formal, ethyl glycidyl formal, propyl glycidyl formal, and butyl glycidyl formal.

By the term polyglycol diglycidyl ethers there are to be understood compounds of the Formula VI VI 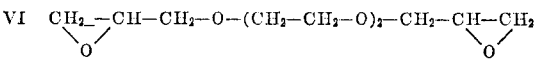

in which $z$ represents a whole number of from 2 to 5. Especially suitable are polyglycol diglycidyl ethers of the abovementioned formula in which $n$ represents 2 or 3, for example diethylene-glycol diglycidyl ether and triethylene-glycol diglycidyl ether.

By the term alkanediol diglycidyl ethers there are to be understood compounds of the Formula VII (VII) 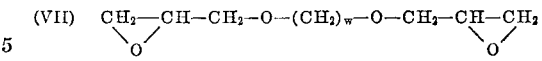

in which $w$ represents a whole number of from 2 to 6, preferably from 2 to 4. Especially suitable is butanediol diglycidyl ether.

By the term bis(alkanetriol)-triformals there are to be understood compounds with a linear and two cyclic formal groups, in particular compounds of the Formula VIII (VIII) 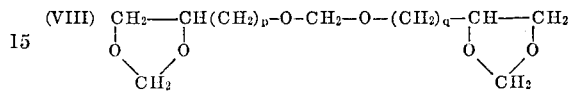

in which $p$ and $q$ each represent a whole number of from 3 to 9, preferably 3 or 4. Suitable are, above all, symmetrical bis(alkanetriol)-triformals of the abovementioned formula in which $p$ and $q$ stand for the same number, for example bis(1,2,5-pentanetriol)-triformal and preferably bis(1,2,6-hexanetriol)-triformal.

The trioxane co- or terpolymers are stabilized against thermal degradation by means of hydrolytic degradation up to the primary alcohol end groups.

The values for the reduced specific viscosity (RSV values) of the polyacetals used in accordance with the invention (measured in butyrolactone stabilized with 2% by weight of diphenylamine at 140° C. with a concentration of 0.5 g./100 ml.) are found to be between 0.07 and 2.50 dl. g.$^{-1}$, preferably between 0.14 and 1.20 dl. g.$^{-1}$. The crystallite melting points of the polyacetals are in the range of from 140 to 170° C.

As mixing component (B) for the above-mentioned polyacetals (A) there are used, according to the invention, two-phase systems of an elastomeric (-caoutchouc elastic) (co-) polymer and a hard (co-) polymer.

In this two-phase mixture the elastomeric phase is dispersed in the hard phase. The proportion of the dispersed caoutchouc elastic phase is in the range of between 5 and 30, preferably between 10 and 20% by weight, whereas the proportion of the hard phase is accordingly in the range of between 95 to 70, preferably between 90 and 80% by weight.

The second order transition temperatures of the elastomeric (co-)polymers are in the range of between —120° C. and +30° C., preferably between —85° C. and 0° C., whereas the hard (co-) polymers have second order transition temperatures of between 70° C. and 160° C., preferably between 100° C. and 140° C.

As caoutchouc elastic phase there are used polybutadiene, copolymers consisting of from 99 to 70, preferably from 80 to 70% by weight of butadiene and from 1 to 30, preferably from 20 to 30% by weight of styrene or acrylonitrile, poly (acrylic acid esters) and copolymers of from 99 to 70, preferably from 80 to 70% by weight of acrylic acid esters and from 1 to 30, preferably from 20 to 30% by weight of styrene, butadiene or acrylonitrile. In this process, use is made advantageously of esters of acrylic acid with aliphatic alcohols having from 1 to 9, preferably from 1 to 4 carbon atoms. Homo- and copolymers of acrylic acid n-butyl ester have proved to be particularly suitable.

The caoutchouc elastic phase consists advantageously of elastomers in which styrene, methyl methacrylate, mixtures of styrene and acrylonitrile or mixtures of $\alpha$-methyl styrene and acrylonitrile in an amount of from 1 to 40% by weight, preferably from 20 to 30% by weight, have been grafted on the above-mentioned homo- or copolymers in order to improve the compatibility with the hard phase.

The Mooney viscosity—measured in accordance with DIN 52,523 (German Industrial Standard)—is for the elastomers used in the range of between 15 and 150, preferably between 30 and 100 Mooney L 4(100° C.).

As hard phase there are used polystyrene, poly(α-methyl styrene), poly(methyl methacrylate) and copolymers consisting of from 99 to 70, preferably from 80 to 70% by weight of styrene or α-methyl styrene and of from 1 to 30, preferably from 20 to 30% by weight of acrylonitrile.

The RSV values of the above-mentioned homopolymers of styrene, α-methyl styrene and methyl methacrylate (measured in toluene at 30° C. with a concentration of 0.1 g./ml.) are in the range of from 0.10 to 2.30 dl.g.$^{-1}$, preferably between 0.10 and 1.40 dl.g.$^{-1}$; particularly good results are obtained if products having RSV values of between 0.40 and 1.00 dl.g.$^{-1}$ are used.

The RSV values of the above-mentioned copolymers of styrene or α-methyl styrene with acrylonitrile (measured in cyclohexanone at 25° C. with a concentration of 1.0 g./100 ml.) are in the range of from 0.10 to 2.30 dl.g.$^{-1}$, preferably between 0.10 and 1.40 dl.g.$^{-1}$; particularly good results are obtained if products having RSV values of between 0.40 and 1.00 dl.g.$^{-1}$ are used.

The mixing of the two-phase component (B) with the polyacetal (A) is effected by means of any kind of mixer, for example in rolls, calenders, kneaders, or extruders. The mixing temperatures are advantageously above the crystallite melting point of the polyacetals and are in the range of from 140 to 250° C., preferably from 170 to 200° C.

The moulding compositions in accordance with the invention exhibit a considerably improved impact strength in the fall test as compared with the initial polyacetals, as can be seen from the comparative experiments shown in the table below. At the same time, only a minor modification in hardness and stiffness can be observed, as compared with the non-modified polyacetal.

In order to stabilize the thermoplastic moulding compositions of the invention, stabilizers against the action of heat, oxygen, and light can be added during the mixing of the components. As heat-stabilizers there can be used, for example, polyamides, amides of polybasic carboxylic acids, amidines, hydrazines, ureas, and poly(N-vinyllactams), as oxidation stabilizers there are used phenols, in particular bisphenols, and aromatic amines, and suitable light stabilizers being used in an amount of from 0.1 to 10, preferably from 0.5 to 5% by weight altogether, calculated on the total mixture.

The moulding compositions in accordance with the invention can be comminuted mechanically, for example by chopping or grinding, to give granules, chips, flakes, or powder. They are thermoplastic and are processed by injection-moulding, extrusion, melt spinning, or deep drawing; they are suitable for the manufacture of semi-finished and finished products, such as shaped articles, for example bars, rods, sheets, films, ribbons and pipes, as well as household articles, for example bowls and beakers, and also machine parts, such as casings and gear wheels.

The following examples serve to illustrate the invention.

EXAMPLES 2 kilograms of a polyacetal (A) (POM) were mixed with varying amounts of the mixing component (B) (ABS) and were homogenized at 200° C. in a single screw extruder. The residence time in the cylinder was about 4 minutes.

Of the products obtained, sheets having the measurements of 60 x 60 x 2 millimeters and shoulder rods according to DIN 53,455 (1/3 standard rod: test sample 3) were manufactured by means of an injection-moulding machine.

In accordance with DIN prescription 53,456 the ball indentation hardness with a test load of 50 kiloponds and a ball diameter of 5 millimeters was measured at the test sheets. The values ascertained according to the invention were in the range of from 1380 to 1520 kp. cm.$^{-2}$.

As a measure for the stiffness of the products of the invention, the yield stress was measured at the above-mentioned shoulder rods by means of a tension tester at a testing rate of 5 centimeters per minute. The values ascertained with the test specimens manufactured from the moulding compositions of the invention were in the range of from 570 to 610 kp.cm.$^{-2}$.

In order to ascertain the impart strength of the products obtained, 40 each of the test sheets mentioned above were subjected to a drop hammer test. For this purpose a sheet which was clamped in a frame was subjected to an impact stress in a way that a drop hammer of a weight of 100 grams was dropped from different heights. The measure for the impact strength is the height at which 50% of the sheets were destroyed and 50% were not damaged.

The following table shows the measurement results obtained with the pure polyacetals and the polyacetals modified in accordance with the invention; for this purpose the following products were used:

(1) POM I

Polyformaldehyde, the OH end-groups of which were esterified by reaction with acetic acid anhydride.
RSV value: 0.78 dl.g.$^{-1}$ (2) POM II A copolymer consisting of 98% by weight of trioxane and 2% by weight of ethylene oxide which had been degradated by means of hydrolysis up to the primary hydroxyl end groups.
RSV value: 0.73 dl./g.$^{-1}$.

(3) ABS I

A mixture of a copolymer of styrene and butadiene (SB) and a copolymer of styrene and acrylonitrile (SAN) which was prepared by mixing a latex of a copolymer of styrene and butadiene with a latex of a copolymer of styrene and acrylonitrile, by precipitation of the latex mixture and by subsequent homogenization of the precipitating polymer mixture in a single screw extruder at a temperature of 220° C. The proportion of the elastomeric phase in the mixture was 25% by weight.

Solid content of SB latex: 50% by weight; styrene content of SB: 23% by weight; Mooney viscosity of SB: 45 Mooney L 4 (100° C.). Structure of the butadiene units in the copolymer: 60% of 1,4-trans form; 22% of 1,4-cis form; 18% of 1,2 form.

Solid content of SAN latex: 50% by weight; acrylonitrile content of SAN: 21% by weight.
RSV value of SAN: 0.75 dl.g.$^{-1}$.

(4) ABS II

A mixture of polybutadiene, a polybutadiene grafted with styrene and acrylonitrile and a copolymer of styrene and acrylonitrile, which was prepared by dissolving polybutadiene in a mixture of styrene and acrylonitrile, by mass polymerization up to a conversion rate of 20% by weight and by subsequent suspension polymeriaztion up to a conversion rate of 100%. The product obtained was homogenized by means of a single screw extruder at a temperature of 220° C.

Mooney viscosity of the polybutadiene: 35 Mooney L 4 (100° C.).

Structure of the polybutadiene: 49% of 1,4-trans form; 43% of 1,4-cis form; 8% of 1,2 form.

The polymer mixture ABS II contained 6% by weight of butadiene, 17% by weight of acrylonitrile, and 77% by weight of styrene.

(5) ABS III

A polymer mixture prepared in accordance with ABS II. The polymer mixture ABS III contained 6% by weight of butadiene, 10% by weight of acrylonitrile, and 84% by weight of styrene.

TABLE

| Example | Component A | Percent by wt. | Component B | Percent by wt. | Ball indentation hardness (kp. cm.⁻²) | Yield stress (kp. cm.⁻²) | Height of fall (cm.) |
|---|---|---|---|---|---|---|---|
| 1 | POM I | 100 | | | 1,550 | 620 | 20 |
| 2 | POM II | 100 | | | 1,474 | 600 | 21 |
| 3 | POM I | 90 | ABS III | 10 | 1,510 | 610 | 87 |
| 4 | POM I | 80 | ABS III | 20 | 1,490 | 610 | 41 |
| 5 | POM II | 90 | ABS II | 10 | 1,447 | 590 | 180 |
| 6 | POM II | 80 | ABS II | 20 | 1,410 | 590 | 94 |
| 7 | POM II | 70 | ABS I | 30 | 1,403 | 570 | 60 |
| 8 | POM II | 60 | ABS I | 40 | 1,387 | 570 | 55 |

We claim:
1. Thermoplastic moulding compositions consisting essentially of a mixture of
(A) from 99 to 50% by weight of
   (a) a homopolymer of formaldehyde or of trioxane, or
   (b) a copolymer of from 99.9 to 80% by weight of trioxane and from 0.1 to 20% by weight of a cyclic ether having from 3 to 5 ring members, or of a cyclic acetal having from 5 to 11 ring members, or of a linear polyacetal, and of from 0 to 5% by weight of an alkyl glycidyl formal, a polyglycol diglycidyl ether, an alkanediol diglycidyl ether or a bis(alkanetriol)-triformal and
(B) from 1 to 50% by weight of a two-phase mixture of
   (a) from 5 to 30% by weight of polybutadiene, or of a copolymer of from 99 to 70% by weight of an acrylic acid ester and from 1 to 30% by weight of butadiene, or of a copolymer of from 99 to 70% by weight of butadiene and from 1 to 30% by weight of styrene, or of a graft copolymer of from 99 to 60% by weight of one of the said homo- or copolymers, and of from 1 to 40% by weight of styrene or α-methyl styrene and/or acrylonitrile or methyl methacrylate, and
   (b) from 95 to 70% by weight of polystyrene, poly(α-methyl styrene) or poly(methyl methacrylate) or of a copolymer of from 99 to 70% by weight of styrene or α-methyl styrene and from 1 to 30% by weight of acrylonitrile.

2. Thermoplastic moulding compositions in accordance with claim 1, in which the specific reduced viscosity of component (A) is in the range of from 0.07 and 2.50 dl.g.⁻¹.

3. Thermoplastic moulding compositions in accordance with claim 1, in which the second order transition temperature of component (B)(a) is in the range of from −120° C. to +30° C.

4. Thermoplastic moulding compositions in accordance with claim 1, in which the second order transition temperature of component (B)(a) is in the range of from 70° C. to 160° C.

5. A process for the manufacture of impact-resistant thermoplastic moulding compositions which comprises homogeneously mixing, at temperatures of from 140° C. to 250° C. of
(A) from 99 to 50 parts by weight of
   (a) a homopolymer of formaldehyde or of trioxane, or
   (b) a copolymer of from 99.9 to 80% by weight of trioxane and from 0.1 to 20% by weight of a cyclic ether having from 3 to 5 ring members, or of a cyclic acetal having from 5 to 11 ring members, or of a linear polyacetal, and of from 0 to 5% by weight of an alkyl glycidyl formal, a polyglycol diglycidyl ether, an alkanediol diglycidyl ether or a bis(alkanetriol)-triformal, and
(B) from 1 to 50 parts by weight of a two-phase mixture of
   (a) from 5 to 30% by weight of polybutadiene or of a copolymer of from 99 to 70% by weight of an acrylic acid ester and from 1 to 30% by weight of butadiene, or of a copolymer of from 99 to 70% by weight of butadiene and from 1 to 30% by weight of styrene or of a graft copolymer of from 99 to 60% by weight of one of the above-mentioned homo- or copolymers and of from 1 to 40% by weight of styrene, or α-methyl styrene and/or acrylonitrile or methyl methacrylate, and
   (b) from 95 to 70% by weight of polystyrene, poly(α-methyl styrene), or poly(methyl methacrylate), or of a copolymer of from 99 to 70% by weight of styrene or α-methyl styrene and from 1 to 30% by weight of acrylonitrile.

6. A thermoplastic molding composition consisting essentially of a mixture of (A) about 90% by weight of a copolymer of trioxane and a minor amount of ethylene oxide and (B) about 10% by weight of a mixture of (a) 5 to 30% by weight of a mixture of polybutadiene and polybutadiene grafted with styrene and acrylonitrile and (b) from 95% to 70% by weight of a copolymer of styrene and acrylonitrile.

7. A thermoplastic molding composition consisting essentially of a mixture of (A) from 99 to 50% by weight of a copolymer of from 99.9 to 80% by weight of trioxane and from 0.1 to 20% by weight of a cyclic ether having from 3 to 5 ring members, or of a cyclic acetal having from 5 to 11 ring members, or of a linear polyacetal, and of from 0 to 5% by weight of an alkyl glycidyl formal, a polyglycol diglycidyl ether, an alkanediol diglycidyl ether or a bis(alkanetriol)-triformal, and (B) from 1 to 50% by weight of a mixture of (a) from 5 to 30% of a mixture of polybutadiene and polybutadiene grafted with styrene and acrylonitrile and (b) from 99% to 70% by weight of a copolymer of styrene and acrylonitrile.

8. A thermoplastic molding composition according to claim 7 in which the specific reduced viscosity of component (A) is in the range of from 0.07 to 2.50 dl./g.

9. A thermoplastic molding composition according to claim 7 in which the second order transition temperature of component (B)(a) is in the range of from −120° C. to +30° C.

10. A thermoplastic molding composition according to claim 7 in which the second order transition temperature of (B)(a) is in the range of 70° C. to 160° C.

References Cited

UNITED STATES PATENTS 3,476,832   11/1969   Pritchard _____ 260—887
3,555,121   1/1971    Tanaka _____ 260—887

PAUL LIEBERMAN, Primary Examiner

U.S. Cl. X.R.

260—45.95, 67 FP, 836, 857 R, 876 R, 879, 880 R, 881, 885, 892, 893, 895, 898, 901